3,278,634
PRODUCTION OF 4-METHYLPENTENE-1
Helmut Mägerlein, Erlenbach (Main), Gerhard Meyer, Obernburg (Main), Wolfgang Rösener, Erlenbach (Main), and Erhard Siggel, Laudenbach (Main), Germany, assignors to Vereinigte Glanzstoff-Fabriken Ag., Wuppertal-Elberfeld, Germany
No Drawing. Filed July 19, 1963, Ser. No. 296,379
Claims priority, application Germany, July 27, 1962, V 22,842
12 Claims. (Cl. 260—683.15)

This invention relates to a method for the production of 4-methylpentene-1 by the catalytic dimerization of propylene. In particular, the invention is directed to an improved catalyst for this reaction.

It has been previously shown that hexenes can be produced by a catalytic dimerization of propylene at elevated temperatures. By selection of a suitable catalyst, a relatively high yield of 4-methylpentene-1 can be obtained in addition to smaller amounts of n-hexene isomers, 2-methylpentene-1 and 4-methylpentene-2. The best results in this respect have been achieved by a process in which the dimerization of propylene is carried out at about 40° C. to 200° C. in the presence of an alkali metal catalyst. In this known process, the alkali metals are employed either in the molten state or precipitated on carrier substances. The best rates of conversion of the propylene into hexenes together with the maximum yields of 4-methylpentene-1 are obtained when using molten potassium or potassium which has been precipitated on an inert carrier. All of the other alkali metals, when used as catalysts according to the known process, give conversion rates which are so low as to make the process impractical.

The principal object of the present invention is to provide an improved process for the production of 4-methylpentene-1 by catalytic dimerization of propylene with a specific catalyst which gives substantially higher conversion rates of propylene and excellent yields of the desired 4-methylpentene-1 product.

Another object of the invention is to provide an improved lithium catalyst for the dimerization of propylene into 4-methylpentene-1. Yet another object is to provide an improved catalyst in the form of a mixture of metallic lithium with an organo-alkali metal compound. Still another object of the invention is to provide an improved process for the continuous dimerization of propylene into 4-methylpentene-1.

These and other objects and advantages of the invention will become more apparent from the following detailed description.

In accordance with the present invention, it has now been found that the catalytic dimerization of propylene in an inert liquid hydrocarbon diluent at elevated temperatures proceeds with very high yields of 4-methylpentene-1 and highly improved conversion rates of the propylene if the dimerization reaction is carried out in the presence of a finely dispersed metallic lithium catalyst obtained by remetallization with another alkali metal of an organic lithium compound, in particular an organic lithium compound of the formula Li—R wherein R is a hydrocarbon radical selected from the group consisting of alkyl of 2 to 18 carbon atoms, cycloalkyl and aryl.

The method of the invention gives especially good results when using as the catalyst the mixture obtained by the remetallization, i.e., a mixture consisting essentially of the very finely dispersed metallic lithium and the organic metal compound formed from the other alkali metal during the remetallization. The other alkali metals are, namely: sodium, potassium, rubidium and cesium. Potassium is especially preferred as the other alkali metal, particularly where the catalyst is the mixture obtained by remetallization.

The dimerization reaction of the invention, other than the novel catalyst, is carried out under generally known conditions, the reaction temperatures being about 100° C. to 180° C., preferably about 160° C. to 180° C., and the propylene being introduced into an inert liquid hydrocarbon solvent or diluent in which the catalyst is distributed. According to the invention, inert hydrocarbons are preferably employed which do not boil under the conditions of the dimerization reaction, for example, gasoline or petroleum distillate fractions with boiling point ranges of about 180° C. to 220° C. Lower-boiling inert hydrocarbons, such as benzene or heptane may also be employed but with these solvents alone the yield per unit time is comparatively lower since it is necessary to work with lower concentrations of propylene in the reaction vessel. The use of higher-boiling hydrocarbons is also recommended because the separation of the various heptene dimerization products is much simpler where there is a greater difference between the boiling points of these reaction products and the boiling points of the inert solvents.

The dimerization reaction can be carried out under a wide range of pressures, preferably at superatmospheric pressure in order to force as much propylene as possible into the reaction medium. In general, the pressure may range from 1 atmosphere up to about 1000 atmospheres, preferably 50 to 250 atmospheres.

The remetallization of the organic lithium compound in providing the catalyst of the present invention is most effectively accomplished by the following procedure. First, the alkali metal other than lithium, e.g., potassium, is melted in an inert liquid hydrocarbon which may correspond to the same hydrocarbon diluent employed in the dimerization reaction. This molten alkali metal is then dispersed and allowed to cool under intense agitation. In this manner, the metal is precipitated in the form of very finely divided particles which are easily dispersed in the diluent. A solution of the organic lithium compound in the same inert hydrocarbon is then added to the initially prepared dispersion of the other alkali metal compound, and remetallization takes place according to the equation

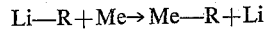
Li—R+Me→Me—R+Li where Me represents the other alkali metal, such as potassium and R represents the hydrocarbon radical, such as butyl. This remetallization reaction does not require any special temperatures or pressures since it proceeds satisfactorily at about room temperature. It is advisable, however, to avoid higher temperatures at which the lithium would melt.

The catalyst mixture thus formed by the remetallization contains solid particles of metallic lithium in especially finely divided form, and this lithium catalyst exhibits a catalytic activity in the dimerization of propylene which cannot be achieved under any conditions in the known process where the alkali metal is used in the molten state. Likewise, alkali metals deposited on various inert carriers also have a considerably poorer activity in the dimerization reaction.

The organic lithium compound itself is not used as a catalyst in the reaction, but serves as a means of producing a highly active metallic lithium catalyst. It is only necessary that the organic lithium compound be sufficiently soluble in the hydrocarbon solvent so as to readily undergo remetallization with the other alkali metal. As suitable organic lithium compounds, there are available a large number of compounds of the formula Li—R in which R is a hydrocarbon radical of at least 2 carbon atoms. Those compounds are preferred wherein R is an alkyl radical, preferably lower alkyl of about 2 to 6 carbon atoms, i.e., ethyl, propyl, butyl, pentyl and hexyl radicals.

In carrying out the dimerization reaction, it is possible to employ the catalyst dispersion as obtained directly from the above-described remetallization procedure, i.e., the catalyst may be produced in situ prior to the reaction itself to provide a catalyst mixture of the finely dispersed particles of metallic lithium and the organic compound of the other alkali metal in the hydrocarbon diluent. On the other hand, the metallic lithium catalyst prepared by the remetallization procedure is also a very active catalyst even when used alone and dispersed in the inert hydrocarbon diluent. Thus, the metallic lithium can be separated from the organic compound of the other alkali metal by routine methods and can then be subsequently dispersed in the diluent as the sole catalyst in the dimerization reaction.

The dimerization of propylene in the method of the invention proceeds most advantageously if the reaction conditions are selected so as to preserve the extremely fine particles of lithium, i.e., so that there is no tendency for these solid particles of lithium to melt and lose their activity. Alkali metals other than lithium cannot be used in the process of this invention in the same manner as lithium itself, i.e., by remetallization from the organometallic compound, because the rate of dimerization is too low at temperatures below the melting point of such other alkali metals.

In the following table, a comparison can be made between the results achieved when the dimerization is carried out according to the known process (see Nos. 1 to 5) and the results with the catalyst prepared according to the present invention (see Nos. 6 and 7). The conversion rate in column 2 of the table is the total amount of hexene obtained per gram of catalyst per hour, while the yield of 4-methylpentene-1, referred to as "4–MP–1," in column 3 is expressed with reference to the total hexene isomers produced. Each experiment in the table was carried out under substantially identical conditions other than the particular catalyst shown in column 1.

TABLE

| Catalyst | Conversion, g. hexene/g. catalyst × hrs. | Yield, percent 4–MP–1 with reference to total hexene |
|---|---|---|
| (1) Li | 0.2 | 78 |
| (2) Na | 0.05 | 26 |
| (3) K | 0.87 | 78 |
| (4) Rb | 0.25 | 63 |
| (5) Cs | 0.1 | 35 |
| (6) Li (from Li-butyl + K) | 27.8 | 86.2 |
| (7) Li (K-butyl removed) | 20.6 | 89.6 |
| (8) K-butyl | 0.62 | 58 |

This table clearly shows that when using the individual alkali metals alone according to the known process, Nos. 1–5, the conversion rate is extremely low and the yields fluctuate widely. Experiment No. 6 was carried out with a catalyst mixture of metallic lithium and potassium-butyl prepared according to the present invention, the same lithium catalyst being used in Experiment No. 7 but with the potassium-butyl removed, and in both cases surprisingly high conversion rates and yields were achieved. Experiment No. 8 clearly shows that potassium-butyl alone provides no significant improvement in results and provides no explanation for the improved conversion rate obtained with the catalyst mixture of Experiment No. 6.

Because of the high conversion rates and excellent yields of 4-methylpentene-1 obtained with the catalyst of the present invention, it is feasible to conduct the dimerization reaction as a continuous process quite smoothly and with a minimum investment in equipment costs. The continuous process is carried out in a relatively small reaction vessel which initially contains the catalyst dispersion of the invention, i.e., the metallic lithium finely dispersed by suitable agitation in the inert hydrocarbon. Into this reaction vessel there is continuously introduced polypropylene and heat is supplied to initiate the dimerization and maintain the reaction temperature. After about one hour or when about a 15% conversion into heptenes has been achieved, a portion of the reaction mixture is withdrawn containing the isomeric hexene products, unreacted propylene and inert hydrocarbon diluent with the catalyst. The hexenes and propylene can readily be degassed from this withdrawn portion and the diluent-catalyst mixture immediately recycled to the reaction vessel. The unreacted propylene can then be readily distilled off from the hexenes and returned with fresh propylene to the reaction zone. The 4-methylpentene-1 with a boiling point of 53.9° C. is readily separated by distillation from the higher-boiling hexene isomers. In the absence of the high yields and conversion rates of the present invention, a continuous production of 4-methylpentene-1 would require exceptionally long reaction times and correspondingly large facilities so as to be impractical from a commercial viewpoint. Accordingly, the continuous operation of the process of this invention is especially desirable in substantially reducing the cost of 4-methylpentene-1.

The process of the invention is further illustrated in more specific detail by the following examples, together with comparative examples of known processes as indicated.

EXAMPLE 1

20.2 grams potassium metal are melted in 1 liter of a high-boiling diesel oil (180 to 220° C.) contained in a 4-liter flask under a nitrogen atmosphere. Under intense agitation, the contents of the flask are cooled and the metallic potassium thereby finely dispersed in the form of solid particles. After reaching room temperature, a solution of 33.1 grams lithium-butyl in 1 liter of said diesel oil is introduced with agitation. The agitation is then continued for 5 more hours for completion of the remetallizing reaction. The finished catalyst mixture is filled into a 20-liter steel alloy autoclave provided with lift agitation. After addition of 2 more liters of diesel oil and 6.5 kg. of propylene, the autoclave is heated to 180° C. The pressure in the autoclave falls within 10 hours from an initial value of 200 atm. to 180 atm. The autoclave is then cooled, and the unreacted propylene released from pressure. The catalyst mixture is decomposed by addition of 200 ml. of ethanol and the autoclave is emptied. From the reaction mixture there are recovered by distillation 970 grams of dimerization products with a content of 86.2% 4-methylpentene-1.

EXAMPLE 2

In the same manner as described in Example 1, 33.1 grams of lithium-butyl are reacted with 14.5 grams of metallic sodium. The dimerization is carried out after addition of 2 liters of diesel oil with 6.6 kg. of propylene at 180° C. The propylene pressure falls within 10 hours from 207 to 185 atmospheres. After working up the reaction product, there is obtained a yield of 835 grams of hexenes containing 85.9% 4-methylpentene-1.

EXAMPLE 3

The catalyst mixture is prepared according to Example 1 and transferred into an elutriation apparatus. In this apparatus the specifically lighter lithium is separated from the potassium butyl by gravity washing.

The lithium thus recovered is introduced according to Example 1 with 2 more liters of diesel oil and with 6.4 kg. of propylene into the autoclave. During a 10-hour reaction period, the propylene pressure in the autoclave falls from 195 to 178 atmospheres. The working up of the reaction product yields 720 grams of hexene-isomers which contain 89.6% 4-methylpentene-1.

*Comparative experiment (lithium in fine distribution, but not produced by remetallizing)*

30 grams of metallic lithium are melted in the same manner as the potassium of Example 1 in diesel oil and cooled under agitation so that a dispersion of fine particles of solid lithium results. This dispersion is introduced as a catalyst together with 3 liters of diesel oil and 6.1 kg. of propylene in a 20-liter autoclave provided with lift agitation. The pressure falls during a reaction period of 10 hours from 189 to 186 atmospheres. The working up of the reaction product yields 55 grams of hexenes containing 78% of 4-methylpentene-1.

*Comparative experiment (potassium-butyl)*

42.6 grams of potassium are suspended as described in Example 1 in 1 liter of diesel oil. To this suspension and under an inert atmosphere, 51 grams of butyl chloride are introduced in which process the temperature is maintained below 10° C. Agitation is then continued for 3 more hours. The potassium-butyl compound thus formed is introduced with 3 more liters of diesel oil into an autoclave and 6.3 kg. of propylene is added under pressure. During the 10-hour reaction period at 180° C., the propylene pressure falls from 192 to 185 atmospheres. 324 grams of hexene isomers are isolated which contain 58.4% of 4-methylpentene-1.

EXAMPLE 4

33.1 grams of lithium-butyl are reacted as described in Example 3 with 20.2 grams of potassium, and the finely divided metallic lithium thus formed is separated from the potassium-butyl. The lithium suspension, together with 4 liters of diesel oil, is introduced into a 10-liter agitator equipped autoclave which forms part of a continuously operating installation. The autoclave is heated to 180° C. and propylene is pressed in up to a pressure of 50 atm. Thereupon, approximately half of the autoclave contents is released through a pressure relief valve, is led through a cooler which cools the product to 100° C., and into a degasser. The propylene pressure in the autoclave is then raised to 200 atm. This pressure is maintained constant during the reaction. After about 1 hour, there is continuously released through the pressure relief valve 1 liter of reaction mixture per hour into the degasser. Here, propylene and hexenes are separated from the catalyst suspension. The catalyst suspension in diesel oil is continuously returned from the degasser by suitable pumps into the autoclave. The recycle of the catalyst suspension is adjusted in such a manner that about one-half of the catalyst suspension is in the autoclave and the other half is in circulation. Propylene and dimerized products are passed through a cooler into a supply or feed column. The propylene is drawn from this column in gaseous form through a gasometer by means of a compressor and pumped back into the autoclave. The hexenes are liquified in the cooler and flow from the feed column into continuously operated distillation apparatus in which the 4-methylpentene-1 is separated from the other higher boiling isomeric hxenes. The hexene yield is about 40 g./hr., and the 4-methylpentene-1 content of the total hexenes is about 90 to 91%.

The invention is hereby claimed as follows:

1. A method for the production of 4-methylpentene-1 which comprises: dimerizing propylene at a temperature of about 100° C. to 180° C. and a pressure of about 1 to 1000 atmospheres in an inert liquid hydrocarbon diluent and in contact with finely dispersed solid metallic lithium obtained by the remetallization of an organic lithium compound of the formula Li—R wherein R represents a radical selected from the group consisting of alkyl of 2 to 18 carbons atoms, cycloalkyl and aryl with another alkali metal.

2. A method as claimed in claim 1 wherein the reaction temperature is about 160° C. to 180° C.

3. A method as claimed in claim 1 wherein the inert hydrocarbon does not boil under the conditions of the dimerization reaction.

4. A method as claimed in claim 1 wherein said dimerization is carried out in the presence of a catalyst mixture consisting essentially of said solid metallic lithium and the organic compound of said other alkali metal.

5. A method as claimed in claim 4 wherein said other alkali metal is potassium.

6. A method as claimed in claim 1 wherein said pressure is about 50 to 250 atmospheres.

7. A method as claimed in claim 1 wherein said organic lithium compound is Li-butyl.

8. A continuous process for the production of 4-methylpentene-1 which comprises: continuously introducing propylene into a dimerization reaction zone containing a catalyst dispersion of solid metallic lithium in an inert liquid hydrocarbon, the solid metallic lithium catalyst being obtained by remetallization of an organic lithium compound of the formula Li—R wherein R represents a radical selected from the group consisting of alkyl of 2 to 18 carbon atoms, cycloalkyl and aryl with another alkali metal, and reacting said propylene in contact with said catalyst at a temperature of about 100° C. to about 180° C. and a pressure of about 1 to 1000 atmospheres; continuously drawing off a mixture of hexene isomers, unconverted propylene, inert hydrocarbon and catalyst; degassing said hexene isomers and propylene from the inert hydrocarbon-catalyst mixture and returning said mixture to said reaction zone; distilling off propylene from said hexene isomers and returning said propylene to said reaction zone; and separating 4-methylpentene-1 from the remaining hexene isomers by distillation.

9. A continuous process as claimed in claim 8 wherein the reaction temperature is about 160° C. to 180° C.

10. A continuous process as claimed in claim 8 wherein said other alkali metal is potassium.

11. A continuous process as claimed in claim 8 wherein said pressure is about 50 to 250 atmospheres.

12. A continuous process as claimed in claim 8 wherein said organic lithium compound is Li-butyl.

References Cited by the Examiner

UNITED STATES PATENTS

| | | | |
|---|---|---|---|
| 3,028,441 | 4/1962 | Bush et al. | 260—683.15 |
| 3,104,271 | 9/1963 | Lindsay | 260—683.15 |
| 3,185,745 | 5/1965 | Lindsay | 260—683.15 |

DELBERT E. GANTZ, *Primary Examiner.*

R. H. SHUBERT, *Assistant Examiner.*